Figure 1:
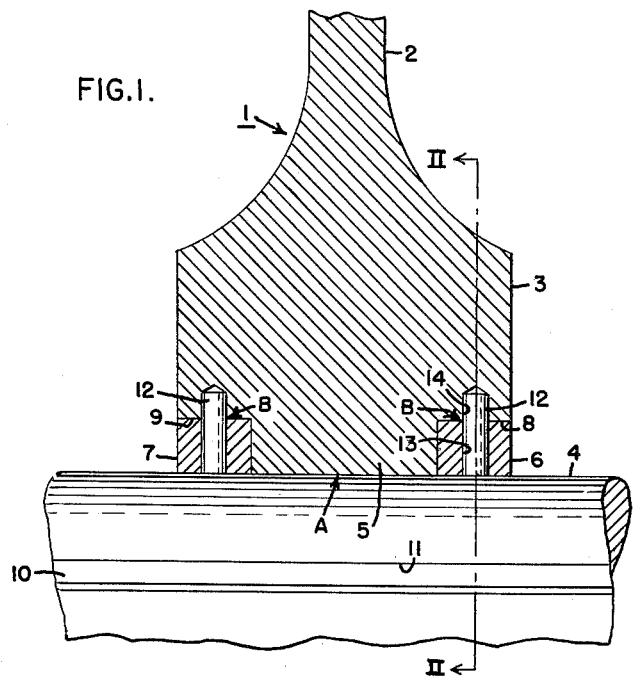

INVENTORS:
ABDON RUBIO,
DONALD F. PARENT,
BY *W. C. Crutcher*
THEIR ATTORNEY.

United States Patent Office 3,077,334
Patented Feb. 12, 1963

3,077,334
PIN-BUSHED TURBINE WHEEL
Abdon Rubio and Donald F. Parent, Schenectady, N.Y., assignors to General Electric Company, a corporation of New York
Filed Oct. 23, 1961, Ser. No. 146,820
3 Claims. (Cl. 253—39)

This invention relates to an improved method for attaching a rotating wheel subject to high temperature variations, such as a turbine wheel, to a shaft, and more particularly, to an improved pin-bushed turbine wheel.

This invention is an improvement over the pin-bushed turbine wheel arrangement disclosed in U.S. Patent 1,326,871 issued to O. Junggren on December 30, 1919 and assigned to the assignee of the present application.

A turbine wheel is highly stressed due to centrifugal force and is also subject to high operating temperatures as well as substantial temperature gradients during startup and shutdown. In order to secure the wheel to the shaft for transmitting torque, the hub of the wheel is very often shrunk onto the shaft or onto an intermediate bushing. The aforementioned Junggren patent disclosed a number of circumferentially spaced radial pins for transmitting torque while also maintaining the turbine wheel coaxial with a bushing keyed to the shaft in the event that unusual thermal gradients, overspeed, or creep exceeded the capability of the shrink fit and caused the hub to become radially separated from the bushing.

The stress in the hub portion of a turbine wheel due to the shrink fit is a compound stress comprised of mutually perpendicular components in the radial, axial, and tangential directions. The total stress is a maximum adjacent to the bore of the hub, decreasing very rapidly in an exponential fashion moving radially outward from the bore. In addition, the stress in the hub may be on the order of 40% higher at the axial center of the hub along the bore diameter than it is at either end of the hub. One of the difficulties with the construction of the aforementioned Junggren patent was that the holes for the pins were located in the most highly stressed region of the bore hub. The stress concentration caused by the pin holes in this region thus compounded the local stress, which could lead to fracture of the turbine wheel during momentary overspeed.

Accordingly, an object of the present invention is to provide an improved pin-bushed turbine wheel wherein the holes for the pins are located in a reduced stress region of the hub, without substantially reducing the load carrying capacity of the hub.

Another object of the invention is to provide an improved arrangement for reducing the stresses in the pin-bushed portion of a turbine wheel mounted with a shrink fit to the shaft while maintaining the hub coaxial with the shaft under conditions of overspeed and excessive thermal gradients.

Figure 2:
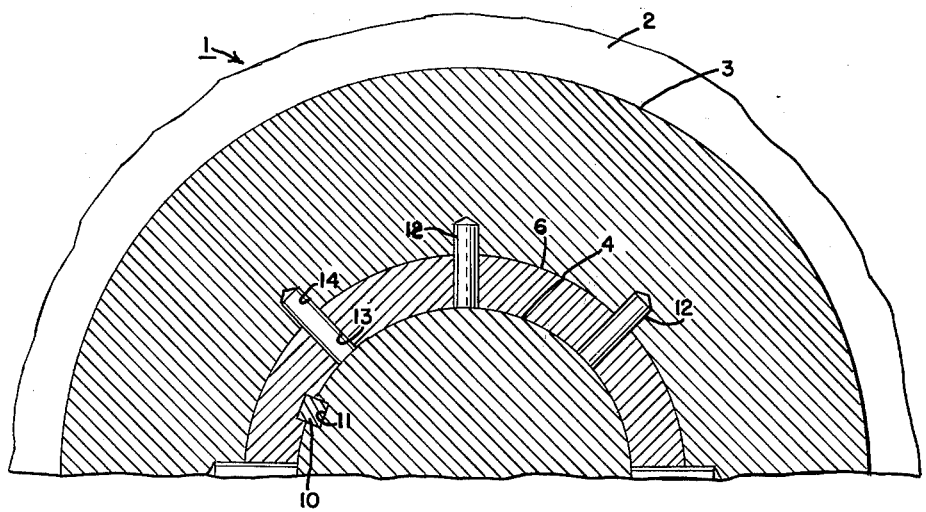

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a horizontal elevation, partly in section, showing the top half of a turbine wheel and a shaft portion; and, FIG. 2 is an axial view of the wheel and shaft portions taken along line II—II of FIG. 1.

Briefly stated, the invention is practiced by employing pin bushings which do not extend the entire axial length of the hub but are located only at the lower-stressed end portions thereof. The highly-stressed central portion of the hub is shrunk directly to the shaft, and the bore is a smooth cylindrical surface, having no discontinuities therein to create regions of stress concentration. Thus, the holes in the hub containing the pins are separated both radially from the shrink-fit region of the bore and axially from the higher stressed center of the hub.

Referring now to FIG. 1 of the drawing, a turbine wheel shown generally as 1 comprises a disk portion 2 carrying rim and suitable blading elements (not shown) on its outer circumference and a hub portion 3. Turbine wheel 1 may be disposed with similar turbine wheels (not shown) on a rotatably mounted shaft 4. Since the buckets on the turbine wheel rim are exposed to the hot motive fluid, turbine wheel 2 will generally be at a much higher temperature than shaft 4 and will undergo differential thermal expansion with respect to shaft 4. Also the effects of centrifugal force on wheel 1 due to the weight of the buckets and of the wheel will tend to expand wheel 1 away from shaft 4 at high speeds. In order to compensate for these effects, while still transmitting torque, hub 3 includes a central portion 5 disposed directly below disk portion 2. The bore diameter of hub portion 5 is selected with regard to the diameter of shaft 4 so that it may be tightly secured to shaft 4 with a shrink fit. Hub portion 5 is aligned symmetrically relative to a radial central plane through disk portion 2 and preferably has an axial length at least as great as the axial thickness of disk 2 above it, so as to afford an adequate volume of metal for supporting the centrifugal forces generated in wheel 1.

In order to maintain coaxial alignment of wheel 1 with shaft 4 in the event that the shrink fit of hub portion 5 on the shaft is insufficient to counteract the combined effects of centrifugal force, creep, and thermal expansion, a pin-bushing arrangement is employed. This arrangement comprises a pair of bushing rings 6, 7 disposed in circumferential grooves 8, 9 at either end of hub 3. Bushings 6, 7 are attached to rotate with shaft 4 by suitable means such as axial keys 10 (FIG. 2) fitting in a keyway 11 on shaft 4.

A number of circumferentially spaced radial pins 12 are disposed in aligned circumferentially spaced radial holes 13, 14 of the bushing and hub respectively. Pins 12 serve to transmit torque between bushings 6, 7 and hub 3 while maintaining hub 3 absolutely coaxial with bushings 6, 7 and thus shaft 4, in the event that hub 3 expands radially away from the bushings and shaft. Pins 12 may be of any suitable number sufficient to carry the weight and torque of wheel 1, as long as there are at least 3, so as to maintain coaxial alignment of wheel and shaft. Ordinarily it is desirable to use about 14 pins.

The method of operation of the improved pin-bushed turbine wheel is as follows. Referring to FIG. 1 of the drawing the region of greatest stress in hub 3, due to the shrink fit and centrifugal force, is at the point indicated by "A," which lies on the bore surface of central hub portion 5 and is located substantially at the axial mid-point of hub 3, directly below the disk portion 2. From point "A," the stress in the hub decreases both in an axial and in a radial direction, the decrease being quite rapid in the radial direction.

It will be observed that the hub holes 14 constitute discontinuities in the bushing grooves 8, 9 at the points indicated by "B." These discontinuities of course cause stress concentrations at these locations. However, it will be noted that the points "B" are spaced both axially and radially from the maximum stress point "A," thereby achieving the combined benefits of the decrease in stress effected by radial and axial displacement from the maximum stress location "A."

It will also be observed that, since bushings 6, 7 do not extend the full axial length of the hub, a larger volume of material is left in hub portion 5 to increase the load-carrying capacity of the hub. This volume of metal in portion 5 carries the primary stresses caused by the shrink fit with the shaft. Therefore, the location of pin holes 14 in a lower stressed region does not significantly affect the torque carrying capability of the hub assembly.

The method of assembly of the improved pin-bushed wheel is as follows. The bushings 6, 7 are first secured in hub 3 with a light shrink fit. The pins 12 are inserted and the wheel is expanded by heating and slid onto shaft 4 so that, upon cooling, a very heavy shrink fit is obtained.

It will be apparent that if the torque loading is low, only one bushing at one end of the hub may be used. For the weight and load requirements contemplated, and for the sake of symmetrical stress distribution in the wheel hub, it is much preferred that a pair of bushings 6, 7 be disposed at either end of the hub. It will also be apparent that the central hub portion 5 may be shifted axially somewhat, in accordance with good design practice, to improve its load-carrying capabilities in the event that the rim and bucket loading on disk 2 is slightly eccentric rather than symmetrical. It will also be appreciated that the invention may be applied to rotor members other than turbine wheels.

While the preferred embodiment of the invention has been disclosed herein, it is to be understood that various other modifications will occur to those skilled in the art, and it is desired to cover by the appended claims all such modifications as fall within the true spirit and scope of the invention.

What we claim as new and desire to secure by Letters Patent of the United States is:

1. A high speed rotor assembly comprising a shaft, a wheel member subject to a substantial tendency to expand radially during operation, and including a disk portion and a central hub of greater axial length than the disk portion, said hub defining a central bore portion forming a shrink fit with said shaft at a location radially aligned with said disk portion, the hub bore also defining an enlarged circumferential recess in at least one end of the hub, a cylindrical bushing secured in said recess between the hub and the shaft and attached to rotate with the shaft, and at least three circumferentially spaced radially disposed pins connecting the hub and the bushing for relative radial displacement therebetween, the outer ends of said pins being disposed in holes in the hub at locations spaced both axially and radially from the maximum stress area of the shrink fit between the hub and shaft.

2. A turbine wheel assembly comprising a shaft, a turbine wheel subject to substantial temperature gradients disposed on said shaft and including both a disk portion and a radially inner hub of greater axial length and symmetrically disposed with respect to said disk portion, said hub defining a bore tightly engaged by a shrink fit to said shaft along an axial length thereof at least as great as the axial thickness of said disk portion, said hub also defining a pair of enlarged circumferential recesses in either end thereof, a pair of cylindrical bushings each of which is tightly engaged in one of said recesses between shaft and hub, means connecting said bushings to the shaft to rotate therewith, first and second sets of at least three circumferentially spaced radial pins, each set connecting the hub and one of the bushings for relative radial movement with respect to one another, said pins entering the hub in circumferentially spaced holes defined by the hub which are disposed at locations radially displaced from the bore of the hub and axially displaced from the axial center of the hub, whereby the pin holes are located in regions of reduced stress.

3. A turbine wheel assembly comprising a shaft, a turbine wheel subject to substantial temperature gradients disposed on said shaft and including a disk portion and a radially inner hub of greater axial length than said disk portion and symmetrically disposed therewith, said hub defining a bore tightly engaged by a shrink fit to said shaft along a length thereof greater than the axial thickness of the disk portion, and also defining first and second enlarged circumferential recesses in either end of the hub, first and second cylindrical bushings attached to rotate with the shaft and tightly engaged in said first and second recesses respectively, said hub and said bushings defining a plurality of circumferentially spaced aligned radial holes, a plurality of dowel pins disposed in said holes connecting the hub and bushings for relative radial movement while maintaining the turbine wheel coaxial with said first and second bushings, said circumferentially spaced hub holes having openings axially spaced from the center of the hub and adjacent the end thereof, the openings of said hub holes also being radially displaced from the shrink fit diameter of the bore and shaft, whereby said dowel holes are located in low-stressed regions of the hub while the central portion of the hub is without stress-raising discontinuities.

References Cited in the file of this patent

UNITED STATES PATENTS

| | | |
|---|---|---|
| 1,326,871 | Junggren | Dec. 20, 1919 |
| 1,949,678 | Doran | Mar. 6, 1934 |
| 1,959,220 | Robinson | May 15, 1934 |